United States Patent
Terry, III et al.

(10) Patent No.: US 6,478,957 B1
(45) Date of Patent: Nov. 12, 2002

(54) FILTERING APPARATUS FOR A WASTEWATER TREATMENT TANK

(75) Inventors: Theophilus B. Terry, III, Sonora, KY (US); Harry L. Nurse, Jr., 12207 Plantation Blvd., Goshen, KY (US) 40026

(73) Assignee: Harry L. Nurse, Jr., Goshen, KY (US)

( * ) Notice: Subject to any disclaimer, the term of this patent is extended or adjusted under 35 U.S.C. 154(b) by 6 days.

(21) Appl. No.: 09/710,076

(22) Filed: Nov. 9, 2000

(51) Int. Cl.[7] .......................... B01D 21/24; B01D 29/64
(52) U.S. Cl. ...................... 210/299; 210/337; 210/342; 210/413; 210/497.01; 210/499; 210/532.2
(58) Field of Search .......................... 210/532.1, 532.2, 210/256, 232, 237, 238, 299, 337, 342, 413, 429–432, 450, 497.01, 499

(56) References Cited

U.S. PATENT DOCUMENTS

| 2,900,084 A | 8/1959 | Zahel | |
|---|---|---|---|
| 3,332,552 A | 7/1967 | Zahel | |
| 5,382,357 A | 1/1995 | Nurse | |
| 5,482,621 A | 1/1996 | Nurse | |
| 5,527,463 A | 6/1996 | Morgan, Jr. | |
| 5,593,584 A | * | 1/1997 | Nurse, Jr. ................. 210/532.2 |
| 5,683,577 A | 11/1997 | Nurse, Jr. | |
| 5,736,035 A | * | 4/1998 | Nurse, Jr. ................. 210/532.2 |
| 6,116,430 A | 9/2000 | Horton | |
| 6,136,190 A | * | 10/2000 | Zoeller et al. ........... 210/532.2 |

FOREIGN PATENT DOCUMENTS

DE 2 307 768 8/1974

* cited by examiner

Primary Examiner—Robert J. Popovics
(74) Attorney, Agent, or Firm—Charles G. Lamb; Middleton Reutlinger

(57) ABSTRACT

A filtering apparatus of T-shaped configuration includes a vertically extending filter element receiving tube and a horizontally extending outlet conduit portion. A removable tubular filtering element having a flexible seal surrounding the outer surface of the filter element at a lower end is engagable with an inner surface of the filter element receiving tube. A stationary filter element is disposed at a juncture of the outlet conduit with a central opening in the vertically extending filter element receiving tube wherein the flexible seal of the filter engages with and cleans the particulates from the stationary filter element upon insertion and removal of the tubular filtering element from the filter element receiving portion.

9 Claims, 3 Drawing Sheets

FILTERING APPARATUS FOR A WASTEWATER TREATMENT TANK

BACKGROUND OF THE INVENTION

This invention relates to a filtering apparatus for a wastewater treatment system and more particularly for a dual filter wherein one filter is removable from a filter housing in the filter system and another filter is integral with an outlet from the filter housing in a wastewater treatment tank.

Filters for removing particulate materials from wastewater effluent are well known. The more common commercially available filters used in the filtration of wastewater effluent include a filtering apparatus including disc-dam filter elements as taught in U.S. Pat. Nos. 2,900,084 and 3,332,552 as well as filter devices which include tubular filter elements with a series of slots extending through the tubular element as set forth in U.S. Pat. Nos. 5,382,357 and 5,683,577. Filtering devices taught by these references have proven to be highly effective for removal of solid matters from fluids, and particularly for the treatment of sewage in septic tanks as well as the removal of other solid matter from liquid in wastewater treatment facilities. However, in most applications these filtering devices become plugged due to the filtering particles getting within the filter openings in the various filtering devices. Thus, these systems must be shut down for the time it takes to remove the filtering devices, clean the filtering devices, and replace them in appropriate filter housings in the treatment tank.

SUMMARY OF THE INVENTION

The present invention relates to a filtering apparatus which includes a dual filtering arrangement therein and more particularly to a filtering apparatus which includes a removable filter element and a stationary filtering element integral with an effluent outlet from a wastewater treatment tank.

An object of the present invention is to provide a filtering apparatus which includes a filter housing of T-shaped configuration having a vertically extending housing portion to receive a removable filter element therein and a horizontally extending outlet conduit portion which includes a stationarily mounted filter at the juncture of the outlet conduit portion with the filter housing portion.

Another object of the present invention is to provide a cylindrical removable filter element having a seal at a lower portion of the filter element extending around the outer surface of the filter element and in contacting relation with an inner surface of a vertically extending filter housing portion of a T-shaped outlet from a wastewater treatment tank.

Even another object of the present invention is to provide a T-shaped outlet for a wastewater treatment tank having a vertically extending filter housing portion with a central opening extending from a bottom end to a top end and a horizontally extending conduit in flow communication with the central opening wherein a first filter element is mounted at the juncture of the horizontally extending conduit of the T-shaped outlet whereby upon removal and insertion of a second filter element into the filter housing portion, the first filter element is cleaned.

More particularly, the present invention provides a filtering apparatus for a wastewater treatment tank having a housing of T-shaped configuration. The T-shaped configured housing includes a vertically extending cylindrically elongated tubular portion having an opening in the top and an open bottom as the inlet for effluent. A horizontally extending outlet conduit portion is in flow communication with the tubular portion. At the juncture of the outlet conduit portion with the tubular portion is a first filter element which is placed over the outlet conduit at the juncture with the filter element receiving portion. A second filter element is received within the tubular portion wherein the second filter element is provided with a first flexible seal extending around the outer surface of the second filter element at a lower end, the flexible seal being engagable with an inner surface of the filter element receiving portion. Upon insertion of the second filter element into and removable from the filter element receiving portion, the flexible seal engages with and cleans the first filter element as it moves either downward or upward across the first filter element. Preferably, a second seal extends around the outer surface of the second filter element at a use location above the outlet conduit.

Examples of arrangements within the scope of the present invention are illustrated in the accompanying drawings and described hereinafter but it will be understood that neither the drawings nor the descriptions thereof are presented by way of limitation and that other arrangements also within the scope of the present invention will occur to those skilled in the art upon reading the disclosure set forth hereinafter.

DETAILED DESCRIPTION OF THE PREFERRED EMBODIMENT

Figure 1:
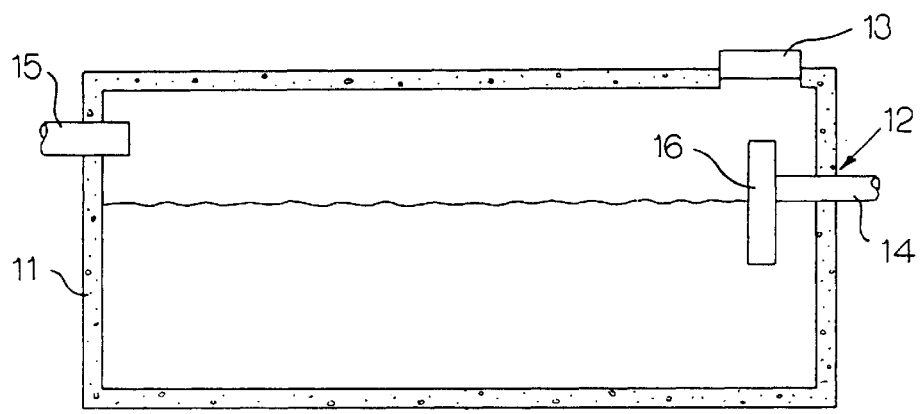
FIG. 1 is a cross-sectional elevational view of an example of a filtering apparatus within the scope of the present invention in a septic tank.

FIG. 1 shows a T-shaped outlet or filtering apparatus housing 12 disposed within a septic tank 11 in a sewage treatment application. The effluent to be filtered in the filtering apparatus 12 is admitted through a septic tank inlet 15 into the septic tank 11. The septic tank 11 is also provided with a top opening with a manhole cover 13 disposed directly above a vertically extending filter element receiving portion or tube 16 of the T-shaped filtering apparatus housing 12. The T-shaped housing 12 is also provided with a horizontally extending outlet conduit portion 14 and a vertically extending central opening 21 (FIG. 4) which extends from a bottom end to the top end of the tube 16.

Figure 2:
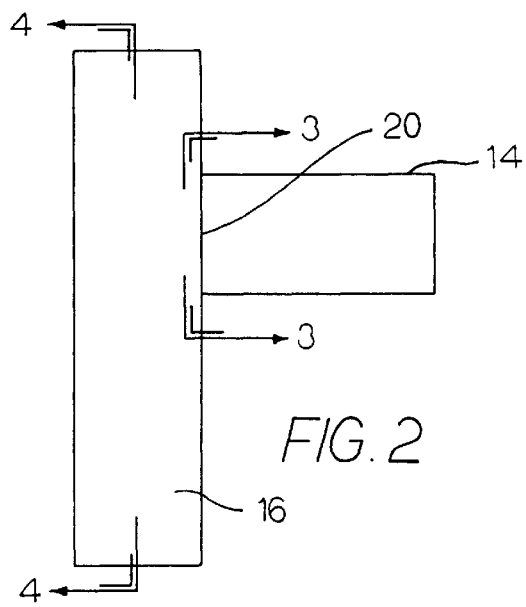
FIG. 2 is an enlarged side view of the filtering apparatus housing for the septic tank as shown in FIG. 1 including a filter element therein.
Figure 3:
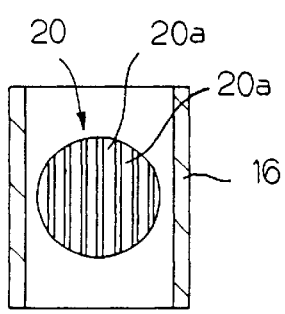
FIG. 3 is a sectional view of the outlet of FIG. 2 taken along lines 3—3 showing a preferred first filter element of the present invention.
Figure 3A:
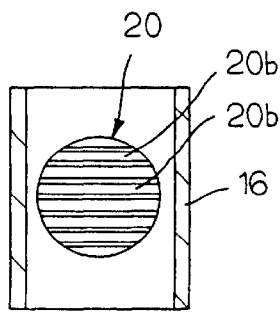
FIG. 3A is a sectional view showing a second embodiment of a first filter element of FIG. 3.
Figure 3B:
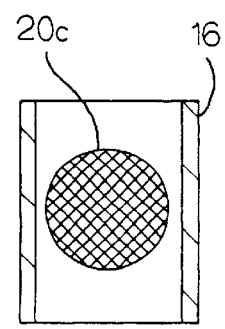
FIG. 3B is a sectional view of a third embodiment of a first filter element as shown in FIG. 3.

As shown in FIGS. 2 and 3, at the juncture of the outlet conduit portion 14 with the central opening 21 (FIG. 4) of the filter element receiving tube 16 is a first filter element 20. The first filter element 20 is generally permanently attached over the opening of the conduit 14 at the juncture with the filter element receiving tube 16. As shown in FIG. 3, the first filter element 20 is made-up of a plurality of vertically extending strips 20a having a spacing therebetween of preselected width, usually of about ⅛", which allows for the effluent to flow therethrough but prevents the particulates of sizes greater than ⅛" of passing therebetween. FIG. 3A shows a variation of the first filter element 20 which includes a plurality of horizontally extending strips 20b which extend across the opening into the conduit portion 14 wherein the spacing between the strips 20b are also of a preselected width the same as those for strips 20a. As shown in FIG. 3B, the first filter element is a filter screen 20c having openings of preselected size therein, also usually about ⅛", to prevent the flow through of particulates which have a diameter greater than the size of the openings.

Figure 4:
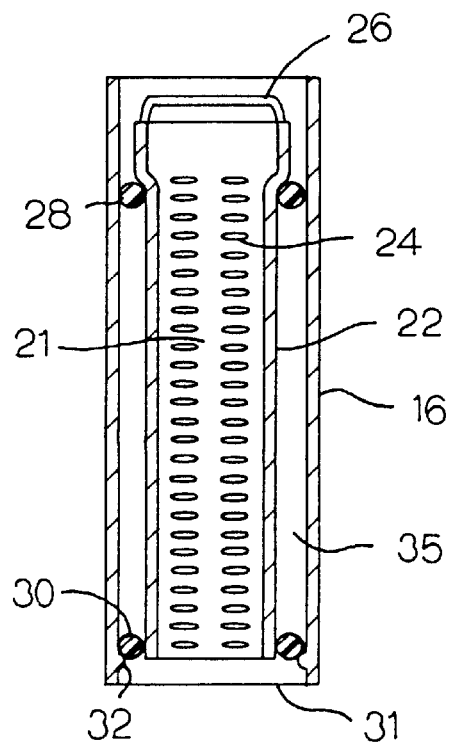
FIG. 4 is a sectional view of the filtering apparatus of FIG. 2 taken along lines 4—4.

As shown in FIG. 4, the filter element receiving tube 16 receives a tubular second filter element 22 having a plurality of slots 24 of preselected width and length therein. The second filter element 22 is provided with a handle 26 for easy removal and insertion into the filter element receiving tube 16. Tubular filter element 22 is also provided with a first flexible seal, shown as an O-ring 30, at the lower end of the tubular filter element 22 and a second flexible seal 28 disposed around the outer surface of the filter element 22 at a top end thereof. The seals 30 and 28 are engagable with the inner surface of filter element receiving tube 16 wherein in a use condition seal 30 is below conduit 14 and seal 28 is above conduit 14. Also, an inwardly extending flange portion 32 integral with the inner surface of the filter receiving tube 16 at a lower portion thereof acts as a stop means for engagement with the O-ring 30 thereby preventing further downward insertion of the filter element 22 and assists in providing a seal between the tubular filter element 22 and the filter element receiving tube 16. Also shown in FIG. 4, an annular space is defined between the outer surface of the tubular filter element 22 and the inner surface of the filter element receiving tube 16. Effluent to be filtered flows upward through the bottom inlet 31 of the filter element receiving tube 16 and into the central opening 21 of the tubular filter element 22. As effluent flows upwardly through the central opening 21 defined by the inner surface of the filter element 22, the effluent is filtered by passing through preselected sized slots 24. Any particulates larger than the width of the slotted openings 24 fall into the tank, and the filtered effluent flows into the spacing 35 defined by the outer surface of the filter element 22 and the inner surface of the filter element receiving tube 16. As shown in FIGS. 2 and 3, the cleaned effluent passes through the first filter element 20 into the outlet conduit portion 14.

Figure 5:
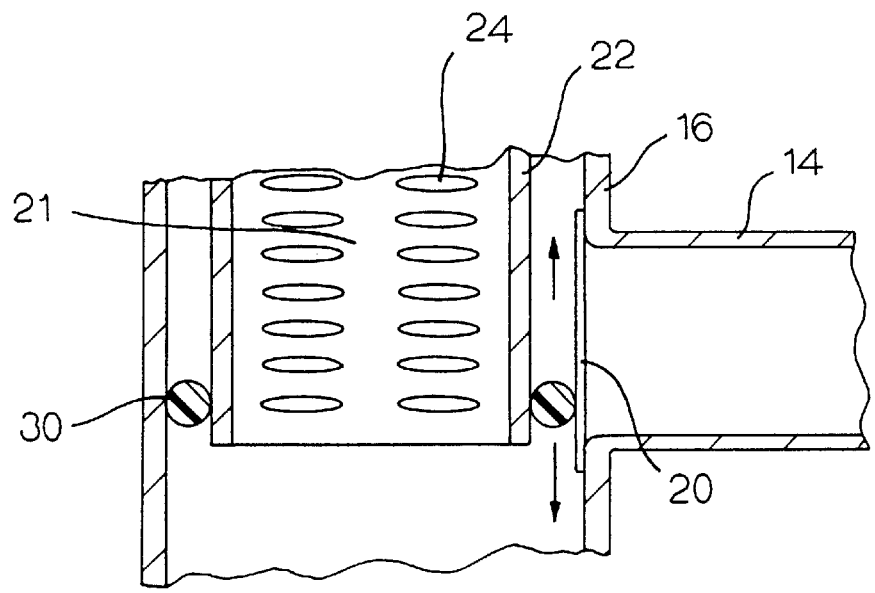
FIG. 5 is an enlarged detailed view illustrating the cleaning of a first filter element of the present invention.
Figure 6A:
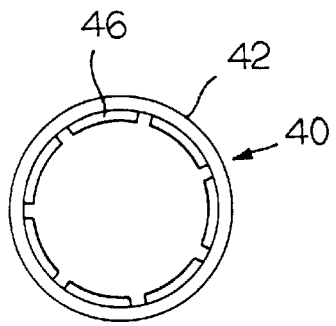
FIG. 6A is a top view of another preferred first filter element of the present invention.
Figure 6B:
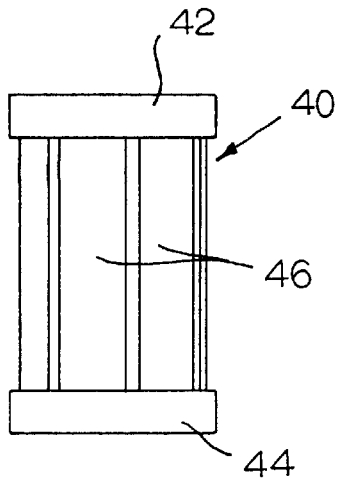
FIG. 6B is a plan view of FIG. 6A.
Figure 6C:
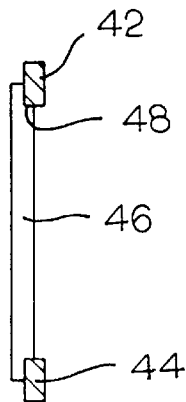
FIG. 6C is a sectional view of a detail of the first filter element of FIG. 6A.
Figure 7:
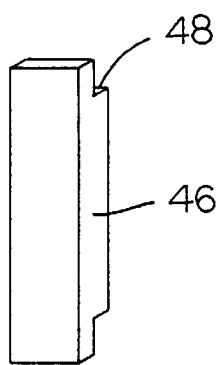
FIG. 7 is a perspective view of a filter strip of the first filter element of FIG. 6A; and, FIG. 8 is a cross-sectional view showing detail of the installation of the first filter element of FIG. 6A in a T-shaped filter housing of the present invention.

As shown in FIG. 5, in the insertion and removal of the filter element 22 from the filter element receiving tube 16, the first flexible seal, shown as an O-ring 30, engages with the outer surface of the first filter element 20 thereby dislodging or removing any build-up of particulates along the surface of the filter element 20.

Even though the preferred embodiment of the present invention is shown using a tubular filter element having slots in the wall thereof, it is realized that other slotted filters, such as those described in U.S. Pat. No. 5,683,577; U.S. Pat. No. 5,382,357; and, U.S. Pat. No. 5,482,621 may be used in the instant T-shaped filter apparatus 12 and are incorporated herein by reference. Also, cylindrically-shaped disc-dam filters, such as those shown in U.S. Pat. No. 2,900,084; U.S. Pat. No. 3,332,552; and, U.S. Pat. No. 4,710,295 are also incorporated herein by reference as being useful in a filtering apparatus of the present invention.

In another embodiment of a first filter element of the present invention as shown in FIGS. 6A–FIG. 8, a first filter element or assembly 40 includes a pair of spaced rings, upper ring 42 and lower bottom ring 44, with a plurality of elongated vertical filter strips 46 extending therebetween, said strips having spacings of a preselected width therebetween. Preferably, the spacings are about ⅛" in width. Strips 46 are provided with cut-outs 48 at each end for engagement with the inner surface and terminating edge of rings 42, 44. The cut-out 48 is generally of a thickness, as best shown in FIG. 6C, less than the thickness of the rings 42, 44, thus providing ease for insertion of the filter assembly 40 into a T-shaped housing as discussed hereinafter.

Figure 8:
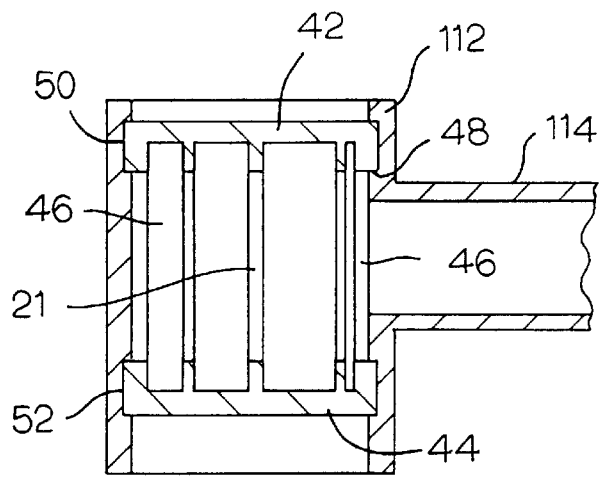

In the filter assembly 40, the rings 42, 44 and strips 46 are generally made of a plastic material which can be easily insertable, as shown in FIG. 8, into a "T"-shaped housing 112 having a horizontal outlet 114. Housing 112 is provided with grooves 50 and 52 to receive the rings 42 and 44, respectively, with the strips 46 being radially inward of the grooves 50, 52.

Moreover, while embodiments within the scope of the present invention are shown and discussed with reference to sewage treatment, it will be understood that devices within the scope of the present invention may be equally effectively used in other applications, such as, for example, the removal of sand and the like from drainage waters as well as other wastewater treatment systems.

Even further, it is understood that the foregoing description is not by way of limitation in the present invention and that other arrangements within the scope of the present invention will occur to those skilled in the art upon reading the disclosure set forth hereinbefore.

What is claimed:

1. A filtering apparatus for a wastewater treatment tank comprising:
   a vertically extending cylindrical elongated filter element receiving tube having an open top and a bottom portion with a central opening within the tube extending from the top to the bottom portion;
   a horizontally extending outlet conduit in flow communication with the central opening of said filter element receiving tube, said outlet conduit having a
   first filter element stationarily mounted at a juncture with said central opening and,
   a removable second filter element received within said filter element receiving tube, said second filter element having a first flexible seal extending around an outer surface at a lower end of said filter element receiving tube, said first flexible seal engagable with an inner surface of said flexible element receiving tube whereby upon removal of said second filter element said first flexible seal engages wit a filtering surface of said first filter element.

2. The filtering apparatus of claim 1 wherein said first filter element is a plurality of vertically extending spaced strips at said juncture.

3. The filtering apparatus of claim 1 wherein said first filter element is a plurality of spaced horizontally extending strips at said juncture.

4. The filtering apparatus of claim 1 wherein said first filtering element is a filter screen at said juncture.

5. The filtering apparatus of claim 1 wherein said first flexible seal is an O-ring.

6. The filtering apparatus of claim 1 wherein said vertically extending filter element receiving tube and said horizontally extending outlet conduit are of unitary construction.

7. The filtering apparatus of claim 1, said first filter element being a pair of spaced rings with a plurality of elongated strips connecting said rings, said strips having spacings of a preselected width therebetween.

8. The filtering apparatus of claim 7, said vertically extending filter element receiving tube having a pair of spaced grooves to receive said pair of spaced rings therein, one of said grooves being above said horizontally extending outlet conduit, the other of said grooves being below said horizontally extending outlet conduit.

9. The filtering apparatus of claim 1, said second filter element having a second flexible seal extending around an outer surface at a top end of said filter element receiving tube, said first seal being positioned below said outlet conduit and said second seal being above said outlet conduit.

* * * * *